(12) United States Patent
Calder et al.

(10) Patent No.: US 6,826,759 B2
(45) Date of Patent: Nov. 30, 2004

(54) METHOD AND APPARATUS FOR DISCOVERING AND ACTIVATING SOFTWARE COMPONENTS

(75) Inventors: Bartley H. Calder, Los Gatos, CA (US); William A. Shannon, Los Altos, CA (US); John Mani, Cupertino, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 08/831,845

(22) Filed: Apr. 1, 1997

(65) Prior Publication Data

US 2001/0042140 A1 Nov. 15, 2001

(51) Int. Cl.[7] .................................................. G06F 9/46
(52) U.S. Cl. ...................... 719/328; 719/315; 719/316; 719/320
(58) Field of Search ................................. 719/328, 315, 719/316, 320; 709/308, 303, 300, 328, 310, 217, 219, 315, 316, 313, 332, 218, 201–203

(56) References Cited

U.S. PATENT DOCUMENTS

| | | | | |
|---|---|---|---|---|
| 5,187,787 A | * | 2/1993 | Skeen et al. ................ 395/600 |
| 5,303,361 A | * | 4/1994 | Colwell et al. ............. 395/425 |
| 5,455,948 A | * | 10/1995 | Poole et al. ................ 707/102 |
| 5,530,864 A | * | 6/1996 | Matheny et al. ............ 719/315 |
| 5,572,675 A | * | 11/1996 | Bergler .................... 395/200.2 |
| 5,615,336 A | * | 3/1997 | Robson et al. ............. 709/316 |
| 5,619,638 A | * | 4/1997 | Duggan et al. ............. 345/781 |
| 5,630,066 A | * | 5/1997 | Gosling ...................... 709/217 |
| 5,630,131 A | * | 5/1997 | Palevich et al. ............ 717/108 |
| 5,781,732 A | * | 7/1998 | Adams ....................... 709/205 |
| 5,815,703 A | * | 9/1998 | Copeland et al. .......... 395/613 |
| 5,838,906 A | * | 11/1998 | Doyle et al. ................ 709/202 |
| 5,922,054 A | * | 7/1999 | Bibayan ..................... 709/328 |
| 5,963,947 A | * | 10/1999 | Ford et al. .................... 707/10 |
| 6,003,050 A | * | 12/1999 | Silver et al. ................ 715/536 |
| 6,006,279 A | * | 12/1999 | Hayes ........................ 709/302 |
| 6,021,433 A | * | 2/2000 | Payne et al. ............... 709/219 |
| 6,023,271 A | * | 2/2000 | Quaeler-Bock et al. .... 345/866 |
| 6,052,456 A | * | 4/2000 | Huang ................... 379/201.04 |
| 6,052,732 A | * | 4/2000 | Gosling ..................... 709/203 |

(List continued on next page.)

FOREIGN PATENT DOCUMENTS

| | | | | |
|---|---|---|---|---|
| EP | 718761 A1 | * | 6/1996 | ........... G06F/9/455 |
| WO | WO 91/17497 | * | 11/1991 | ............. G06F/9/44 |

OTHER PUBLICATIONS

Gibbs. "Navigating the Internet.", 1994.*
Livingston. "Windows 95 Secrets", 1995.*

(List continued on next page.)

*Primary Examiner*—Lewis A. Bullock, Jr.
(74) *Attorney, Agent, or Firm*—Beyer Weaver & Thomas, LLP

(57) ABSTRACT

Methods, software, and apparatus for transparently pairing data with a command object, with respect to the application which wishes to present the data, are disclosed. In one aspect of the present invention, a computer-implemented framework for associating data with a command object includes a data handler mechanism arranged to interface with an application which wishes to use the data. The framework also includes a data retriever mechanism that is arranged to obtain the data, and is in communication with the data handler mechanism, as well as a mapping mechanism, which is also in communication with the data handler mechanism, and is arranged to obtain the command object. In one embodiment of the present invention, the data is a stream of bytes, and the data handler mechanism is used to bind the stream of bytes to the command object.

27 Claims, 9 Drawing Sheets

U.S. PATENT DOCUMENTS

| | | | | |
|---|---|---|---|---|
| 6,078,951 A | * | 6/2000 | Pashupathy et al. | 709/217 |
| 6,134,552 A | * | 10/2000 | Fritz et al. | 707/10 |
| 6,167,455 A | * | 12/2000 | Friedman et al. | 719/320 |
| 6,192,361 B1 | * | 2/2001 | Huang | 707/9 |
| 6,330,659 B1 | * | 12/2001 | Poff et al. | 712/34 |
| 6,356,931 B2 | * | 3/2002 | Ismael et al. | 709/202 |

OTHER PUBLICATIONS

Fulton. "Netscape Navigator", Jul. 1996.*

(SUN) Sun Microsystems. "The Java Language Environment", Oct. 1995.*

Williams, Robin. "Jargon, An Informal Dictionary of Computer Terms." 1993, definition of multitasking.*

IDG Books. "Windows 95 for Dummies." 1995. p. 73.*

DEC. "Digital UNIX, Command and Shell User's Guide". Mar. 1996. pp. 6-6-6-8.*

* cited by examiner

METHOD AND APPARATUS FOR DISCOVERING AND ACTIVATING SOFTWARE COMPONENTS

BACKGROUND OF THE INVENTION

1. Field of Invention

The present invention relates generally to methods, software, and apparatus for discovering and activating software components for use with a software application.

More particularly, the present invention relates to methods, software, and apparatus for associating data with a component such that an application which is arranged to present the data may do so through the use of the component, without directly specifying the component to be used.

2. Background

A computer software application typically has access to one or more software components, e.g., viewers, which the software application may use to present and to manipulate data. By way of example, a file manager application may use an editor which enables the data in a file to be viewed and edited, while an electronic mail application may use a viewer which enables attachments sent with mail messages to be viewed.

In general, a computer system will include numerous different applications which are arranged to manipulate data. In some cases, different applications may be arranged to manipulate the same types of data, e.g., text data, audio data, or image data. Therefore, different applications may utilize substantially the same software components, or command objects. Maintaining separate command objects which serve the same purpose, but are associated with different applications, enables data to be presented and manipulated by the applications. However, the maintenance of separate command objects for each application consumes many system resources, e.g., storage resources, and is, as a result, inefficient. The maintenance of separate command objects for each application is further inefficient in that command objects which serve substantially the same purpose may not be reused by different applications and, hence, must generally be rewritten for each application.

In order to take advantage of the fact that common command objects are often used by different applications, a set of command objects may generally be made available to substantially all of the applications associated with an overall computer system, e.g., a computer network. That is, a set of command objects that are arranged to be used by numerous applications may be provided. When an application is arranged to utilize a set of command objects that are used by numerous applications, the application is commonly "directly" associated with any command objects the application may use. Such a direct association involves providing the application with identifiers for the command objects which are used by the application to bind, or pair, data with a suitable command object. The command object is then used to present and to manipulate the data that is paired with the command object. By way of example, a file manager application, which accesses file data, is provided with identifiers for text viewers which are suitable for use in viewing file data.

As computer systems and, therefore, applications are becoming more advanced, the types of data which may be manipulated by different applications, as well as the command objects used by applications to manipulate data, often change, e.g., an electronic mail application which previously accepted only text attachments may be expected to also accept image attachments. However, using a framework which involves directly associating an application with a set of command objects that are available to the application does not facilitate the inclusion of new command objects. In other words, when it is desired for an application to be able to bind data with a new command object, and to utilize the new command object, the new command object must somehow be directly associated with the application. As such, the addition of new command objects often requires that applications be modified to recognize the new command objects.

The process of directly associating new command objects with applications is inefficient, as the process typically involves reconfiguring at least portions of the applications such that the applications recognize the new command objects and, further, serve to associate data with the new command objects. By way of example, a look-up table used by the application to associate data with command objects must be modified to include any new command objects which the application may use.

Therefore, what is desired is an efficient method for binding data with suitable command objects such that an application which executes the command object is impervious to the binding process. In other words, a framework which enables data that is associated with an application to be paired with an appropriate command object, substantially without involving the application, is desired.

SUMMARY OF THE INVENTION

To achieve the foregoing and in accordance with the purpose of the present invention, methods, software, and apparatus for transparently pairing data with a command object, with respect to the application which wishes to present the data, are disclosed. In one aspect of the present invention, a computer-implemented framework for associating data with a command object includes a data handler mechanism arranged to interface with an application which wishes to use the data. The framework also includes a data retriever mechanism that is arranged to obtain the data, and is in communication with the data handler mechanism. A mapping mechanism, which is also in communication with the data handler mechanism, is arranged to obtain the command object.

In one embodiment of the present invention, the data is a stream of bytes, and the data handler mechanism is used to bind the stream of bytes to the command object. In another embodiment, the data retriever mechanism includes a data content handler mechanism that is also in communication with the data handler mechanism. The data content handler mechanism is arranged to convert data into a data object which may be created using the Java™ programming language.

In accordance with another aspect of the present invention, a computer-implemented method for associating data with a command object in response to a request from an application involves accessing the data through an interface that processes requests from the application, and accessing a mapping mechanism which is in communication with the interface. The mapping mechanism, which is accessed by the interface, is arranged to locate a command object that is appropriate for the data. The method for associating data with a command object also involves using the mapping mechanism to obtain the command object that is appropriate for the data, to bind the command object to the data, and to return the command object to the application through the interface.

In one embodiment, the data is a data object that is created by a content handler mechanism which is accessed by the data handler. The content handler mechanism is arranged to create a data object from a stream of bytes. In another embodiment, the data is a stream of bytes, and accessing the data through the interface involves accessing a data retriever which is arranged to obtain the data.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE EMBODIMENTS

When an application is to be used to access and to present data to a user, a command object, as for example a text editor, is typically the mechanism which is used by the application to actually present the data. In general, command objects are software components which are arranged to be used with specific types of data. By way of example, a command object that is an image viewer is arranged to be used with image data, whereas a command object that is a text editor is arranged to be used with text data. As many applications may use the same, or similar, command objects, the number of command objects associated with an overall computer system may be consolidated by permitting different applications to utilize a set of shared command objects. It should be appreciated that consolidating the number of command objects associated with a computer system generally improves the overall efficiency of the computer system.

In general, data is bound, or otherwise paired, with a suitable command object when an application requires that the data be presented, e.g., displayed, edited, or printed. A framework which enables an application to be "blind" to the process of binding data with an appropriate command object allows new types of data and, therefore, new command objects, to be created for use with the application without requiring that the application be modified to recognize the new command objects. In essence, the application would not need to be directly associated with specific command objects. Instead, the application may have access to a general interface which serves to gather data and to associate the data with an appropriate command object, as will be described below with reference to FIG. 1. By maintaining command objects independently from applications, data types and command objects may be modified, created, and deleted without affecting the applications which use the data types and command objects.

It should be appreciated that the details associated with command objects are generally not important to the execution of an application. That is, the details of how a command object, e.g., a text viewer, operates to display data associated with an application, e.g., a file associated with a file manager application, is typically of little interest to the application. As such, maintaining command objects independently from applications will, in general, not significantly affect the execution of the applications.

Figure 1:
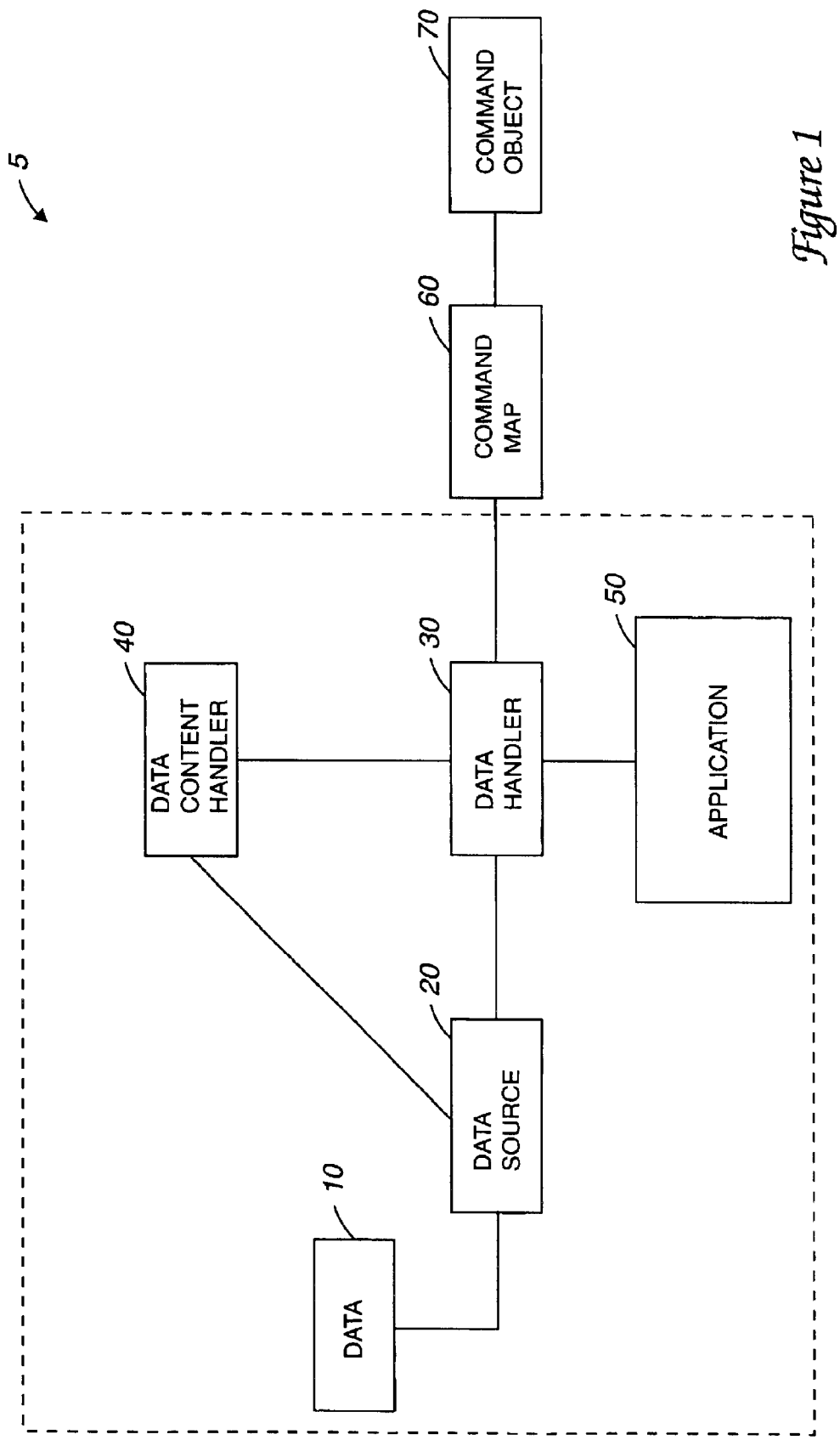
FIG. 1 is a diagrammatic representation of a framework suitable for enabling the selection of an appropriate command object for a given data type in accordance with an embodiment of the present invention.

Referring initially to FIG. 1, a framework which is suitable for enabling a command object to be selected for a given data type, without directly involving the application which will utilize the command object, will be described in accordance with an embodiment of the present invention. That is, a framework 5 which is suitable for matching data types with associated command objects that will be used by an application will be described.

Framework 5 generally includes an application 50 that is arranged to present data to a user. Application 50 may include any suitable software application, as for example a file manager application, an electronic mail application, or a World Wide Web (WWW) browser application. In general, a file manager application presents data to a user by enabling files associated with the file manager application to be viewed and edited. An electronic mail application may present data to a user by enabling attachments associated with an electronic mail message to be viewed. A browser application typically presents data to a user by allowing objects associated with a site on the World Wide Web, e.g., a "web page," to be viewed. It should be appreciated that in one embodiment, application 50 may be considered to be a "client" process in an object-oriented computing system, as application 50 requests a "service," e.g., "server" process, from a command object. In other words, application 50 may reside on a computer that is part of a computer network, while a command object may reside on another computer that is a part of the computer network.

A data handler class 30 provides an interface which may be used by application 50 to manipulate data. That is, data handler class 30 is arranged to access data in response to a request from the application. It should be appreciated that, in general, there is only a single data handler class 30, or type, from which instances may be created. An instance of data handler class 30 communicates with an instance of a data source class 20, e.g., a data source object, that is arranged to retrieve data 10 and to make data 10 available to overall framework 5. An instance of data source class 20 is typically arranged such that the instance of data source class 20 is aware of where data 10 is stored. In other words, an instance of data source class 20 has access to data 10 and is arranged to retrieve data 10. It should be appreciated that a different data source class 20 will generally be used for each type of data storage location that may contain data 10, e.g., disk files, electronic mail messages, or web servers. Hence, a different instance of a data source object 20 will be created for each type of data 10.

Data 10 may be obtained from any suitable source, including, but not limited to, a data file, an electronic mail attachment message, or a web server. In general, data 10 may be stored in a storage mechanism associated with a computer system, e.g., in a file on a computer disk or tape, or in a file located in random access memory (RAM), as will be appreciated by those skilled in the art. When an instance of data source class 20 retrieves data 10, in the described embodiment, data 10 is passed to the instance of data source class 20 as a stream of bytes.

In one embodiment, instance of data source 20 forwards the retrieved stream of bytes to an instance of a data content handler class 40. It should be appreciated that each instance of data handler class 30 uses an instance of data content handler class 40 to convert the format of the stream of bytes retrieved by data source class 20, if such a conversion is desired. Instances of data content handler class 40 are generally arranged to convert the stream of bytes into a data object, as for example a Java™ object which is created using the Java™ programming language available commercially from Sun Microsystems of Mountain View, Calif. By way of example, if the stream of bytes is associated with an image, then data content handler class 40 is used to convert the stream of bytes into an image object, e.g., a Java™ image object.

A command map 60 is used by data handler class 30 to locate an appropriate command object 70, e.g., viewer, for the data 10 that application 50 wishes to present. In general, command map 60 takes as input a desired operation, and maps the desired operation to a command object 70 which is suitable for performing the desired operation. Once a suitable command object 70 is obtained, command map 60 returns command object 70 to application 50 via an instance of data handler class 30. It should be appreciated that application 50 then uses command object 70 to present data 10, which may either be an object, as generated using data content handler class 40, or a stream of bytes.

Although any suitable mechanism may be used to locate a command object 70, in one embodiment, a look-up table is used to locate an appropriate command object 70 using the desired operation as a "key" in the look-up table. By way of example, command map 60 may use the type of data, e.g., MIME text or hypertext mark-up language (HTML) data, and the desired operation, e.g., an editing operation, in conjunction with a look-up table to locate a command object which is suitable for editing HTML type data.

While command objects 70 may be any suitable software components, in the described embodiment, command objects are preferably Java™ Beans, which may be created using the Java™ programming language available commercially from Sun Microsystems of Mountain View, Calif. Java™ Beans are, typically, reusable software components which may be executed in a range of different environments, as well as in conjunction with application 50. Java™ Beans include, but are not limited to, visual software components such as database viewers.

Framework 5, as previously mentioned, may be used by any suitable application 50. Data 10, command map 60, and command object 70 are typically "generic," e.g., the same data 10, command map 60, and command object 70 may be used by more than one application. Instances of data source class 20 and instances of data handler class 30, as well as instances of data content handler class 40, are application instance-specific. That is, different instances of data source class 20, data handler class 30, and, in some embodiments, data content handler class 40, are created for each instance of data which is associated with framework 5. As such, for each application 50 that uses framework 5, instances of data source class 20, which are specific to where data is to be obtained, and data handler class 30 are initialized.

Figure 2:
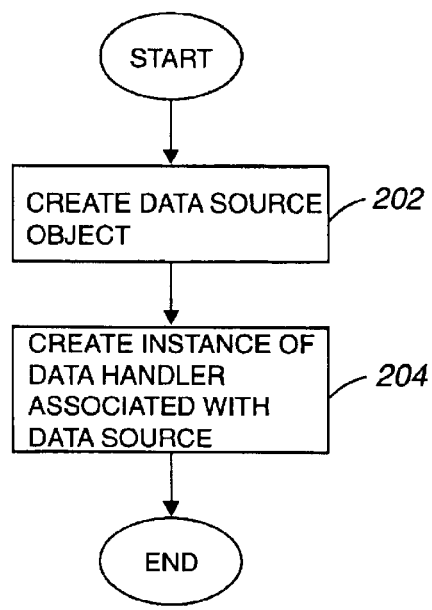
FIG. 2 is a process flow diagram which illustrates the steps associated with initializing framework components in accordance with an embodiment of the present invention.

FIG. 2 is a process flow diagram which illustrates the steps associated with initializing framework components which will be used by an application in accordance with an embodiment of the present invention. Framework components, e.g., an instance of a data source class and an instance of a data handler class, are created by an application during execution of the application when the application requires access to data. It should be appreciated that the application may be any suitable application, as for example a file manager application which generally allows file data to be edited, printed, or viewed.

An application creates a data source object that is an instance of a data source class in step 202. If the application associated with the data source object is a file manager, for example, each data source object that is created represents an associated file. Further, each data file is arranged to access the associated file, and, hence, the data contained therein. It should be appreciated that, in general, when the application is a file manager, for each file in a view of the file manager, i.e., each file in a "set" specified by the file manager, a data source object is typically created. One method that is used to create a data source object will be described below with reference to FIG. 3. In one embodiment, the data source objects associated with an application may be predetermined. That is there may be a fixed set of data source objects associated with a computer system and, therefore, an application. As such, the initialization of a data source object that is associated with an application may involve simply matching a particular, existing data source object to a type of data storage location.

After the data source object is created in step 202, the application uses the data source object to create an instance of the data handler class, i.e., a data handler that is associated with the data source is created using the data source, in step 204. In the described embodiment, data sources and data handlers have a one-to-one relationship. That is, an instance of a data source class is associated with only a single instance of the data handler class, and an instance of a data handler class is associated with only a single instance of a data source class. Herein and below, an instance of a data source will be referred to interchangeably as a data source object. Similarly, an instance of a data handler class will be referred to alternatively as a data handler for purposes of discussion.

At the time the data handler is created, information relating to the data source object associated with the data handler is provided to the data handler. Providing the data handler with this data source object information essentially "binds" the data source object to the data handler. Once both the data source and the data handler are created, the initialization process is completed.

Figure 3:
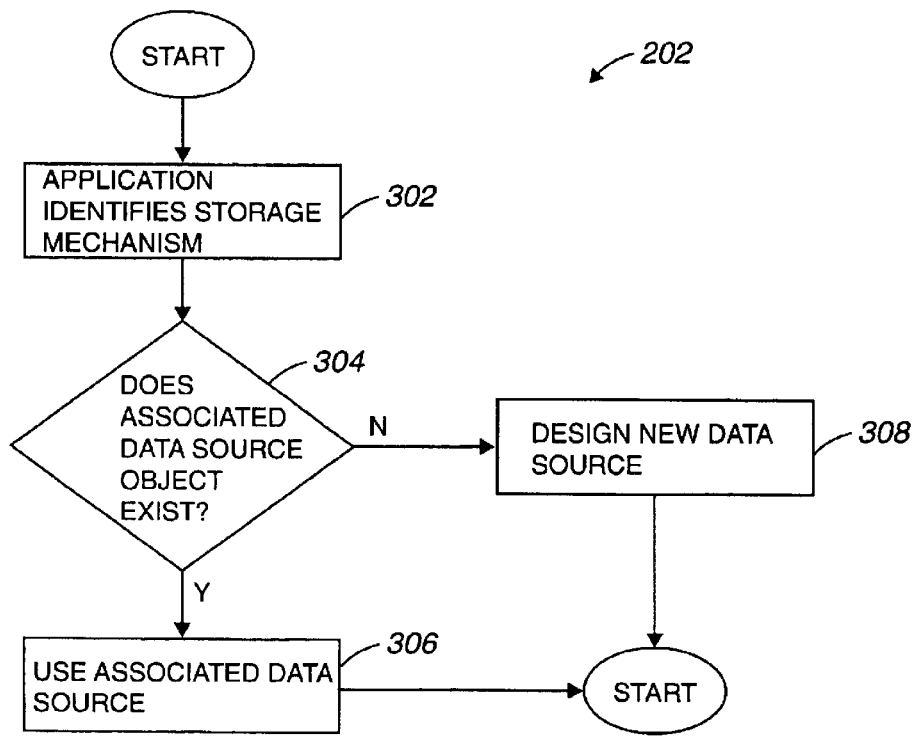
FIG. 3 is a process flow diagram which illustrates the steps associated with creating a data source object, i.e., step 202 of FIG. 2, in accordance with an embodiment of the present invention.

FIG. 3 is a process flow diagram which illustrates the steps associated with creating a data source object, i.e., step 202 of FIG. 2, in accordance with an embodiment of the present invention. In order for an application to obtain and present data, the application preferably first obtains a data source that is appropriate for retrieving stored data It should be appreciated that the application is generally aware of where data is stored. By way of example, if the application is a file manager, the application "knows" that data is stored in files. Alternatively, if the application is an electronic mail application, the application is aware that data is stored in mail messages or attachments to the mail messages.

In step 302, the application identifies a storage mechanism in which data that the application is arranged to present is stored. The storage mechanism may be any mechanism which is suitable for storing data, e.g., a file in a database on a computer disk, as was mentioned above with respect to FIG. 1.

After the storage mechanism is identified, a determination is made in step 304 regarding whether a data source object exists that is appropriate for the type of data the application is arranged to manipulate. If it is determined that an appropriate data source is already in existence, or is a part of a predetermined, fixed set of data sources, then process flow moves to step 306 in which the appropriate data source will be used to retrieve data, as will be described below with reference to FIG. 5, and the process of creating a data source object ends. Alternatively, if the determination in step 304 is that an appropriate, associated data source object is not in existence, then a new data source must typically be designed, or implemented, for use with the application in step 308. In general, any suitable method may be used to design a new data source, or data source object, as will be appreciated by those skilled in the art. After the new data source is designed, the process of creating a data source ends.

Once the framework, as described above with respect to FIG. 1, is initialized, e.g., once data source objects and data handlers associated with a particular application are created, a command object may then be obtained by the application through the use of the framework. One method of obtaining and executing a command object will be described with respect to FIG. 4, in accordance with an embodiment of the present invention. An application collects and displays the name and the icon for a data object from a data handler in step 404. The name and the icon for a data object are collected such that a user who is using the application is presented with a representation of the data he or she may utilize. By way of example, if the application is a file manager, then the names and the icons for files are collected and presented to the user. The process of collecting and displaying the name and the icon for a data object will be described below with reference to FIG. 5.

Once the name and the icon for the data object have been obtained and displayed, the application then receives a request for a list of available commands in step 404. In other words, the list of available commands which may be invoked on the data object are requested, typically from user input. Although any suitable interface may be used by a user to request a list of available commands, standard interfaces include a graphical user interface (GUI) which accepts input from a keyboard or any other computer input device, e.g., a computer mouse.

Upon receiving a request for a list of available commands, the application then collects a suitable list of available commands from the data handler, and displays the list of available commands in step 406. The steps associated with collecting and displaying a list of available commands associated with a data object will be discussed below with respect to FIG. 6.

From the step of collecting and displaying the list of available commands, process flow proceeds to step 408 where the application receives a request to execute, or activate, a selected one of the available commands. In general, it should be appreciated that the request to execute an available command selected from the command list will be initiated by a user who is interfacing with the application. After the application receives a request to execute an available command, the application asks, or queries, the data handler for the command object that is associated with the selected command. The process of obtaining the appropriate command object from the data handler will be described below with respect to FIG. 7. Once the command object is obtained, the application then executes the command object in step 412. The steps associated with the execution of the command object will be discussed below with reference to FIGS. 8 and 9. After the command object is executed, the process of obtaining and executing a command object is completed.

Figure 4:
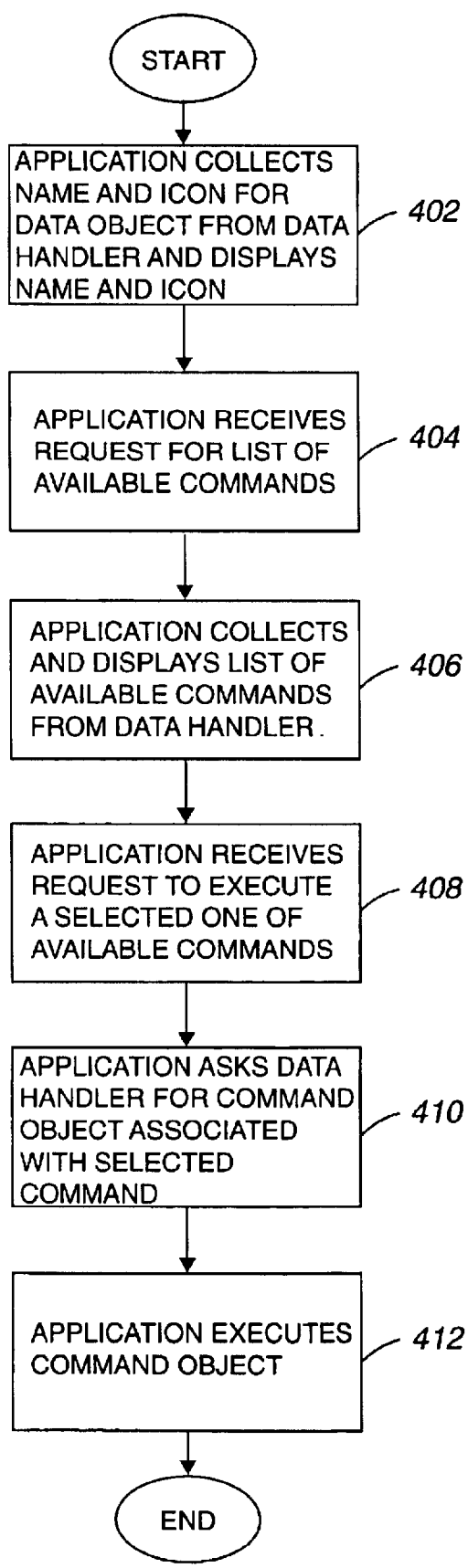
FIG. 4 is a process flow diagram which illustrates the steps associated with obtaining and executing a command object will be described in accordance with an embodiment of the present invention.
Figure 5:
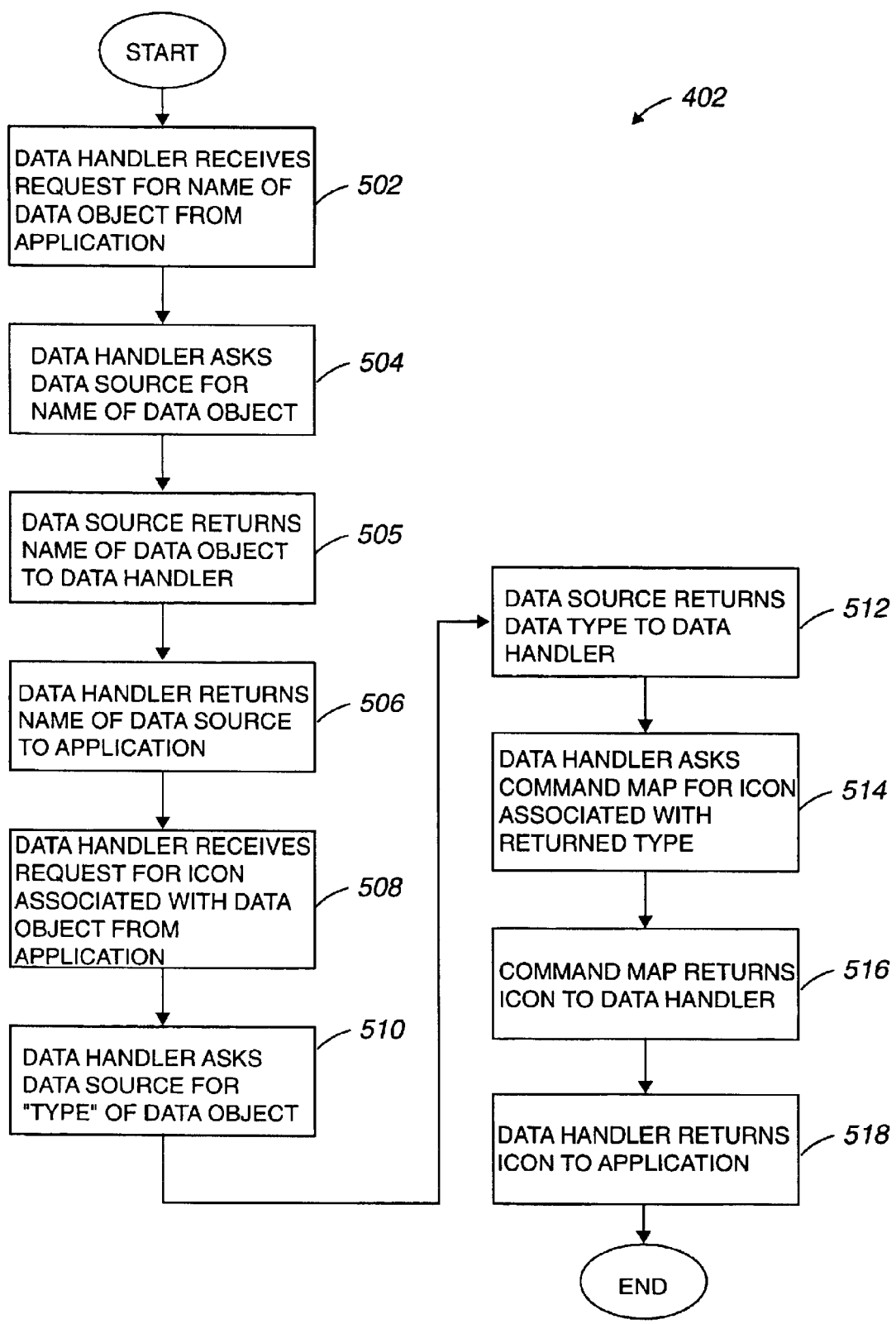
FIG. 5 is a process flow diagram which illustrates the steps associated with collecting a name and an icon for a data object, i.e., step 402 of FIG. 4, in accordance with an embodiment of the present invention.

Referring next to FIG. 5, a process of collecting names and icons for a data object will be described in accordance with an embodiment of the present invention. That is, step 402 of FIG. 4 will be described. The data handler receives a request for the name of a data object from the application in step 502. Once the data handler receives the request for the name of a data object, the data handler queries a data source object, or data source, for the name of the data object in step 504. It should be appreciated that in the described embodiment, the data source object has access to the name of the data object because the name of the data object is embedded in the data source object at the time of creation. As there is a one-to-one correspondence between data source objects and associated instances of data, the name of the data object is typically inherent to the data source object with which the data object is associated.

In response to the query for the name of the data object, in step 505, the data source object returns the name of the data object to the data handler. Then, in step 506, the data handler returns the name of the data object to the application. After the name of the data object is returned to the application, process flow proceeds to step 508 where the data handler receives a request from the application for the icon that is associated with the data object.

In step 510, the data handler queries the data source for a "type" associated with the data object. In one embodiment, the data object may be of a text type or an image type. It should be appreciated that a data object that is of a text type may be considered to be a text object, while a data object that is of an image type may be considered to be an image object. After the type information is obtained, the data source returns the data type to the data handler in step 512.

From step 512, process flow moves to step 514 where the data handler queries the command map for an icon associated with the returned data type. It should be appreciated that in the described embodiment, an icon exists for each data type. As such, a query to the command map for an icon will typically be successful. Once an icon is located, the command map returns the icon to the data handler in step 516. Then, in step 518, the data handler returns the icon to the application, and the process of collecting a name and an icon for a data object is completed.

Figure 6:
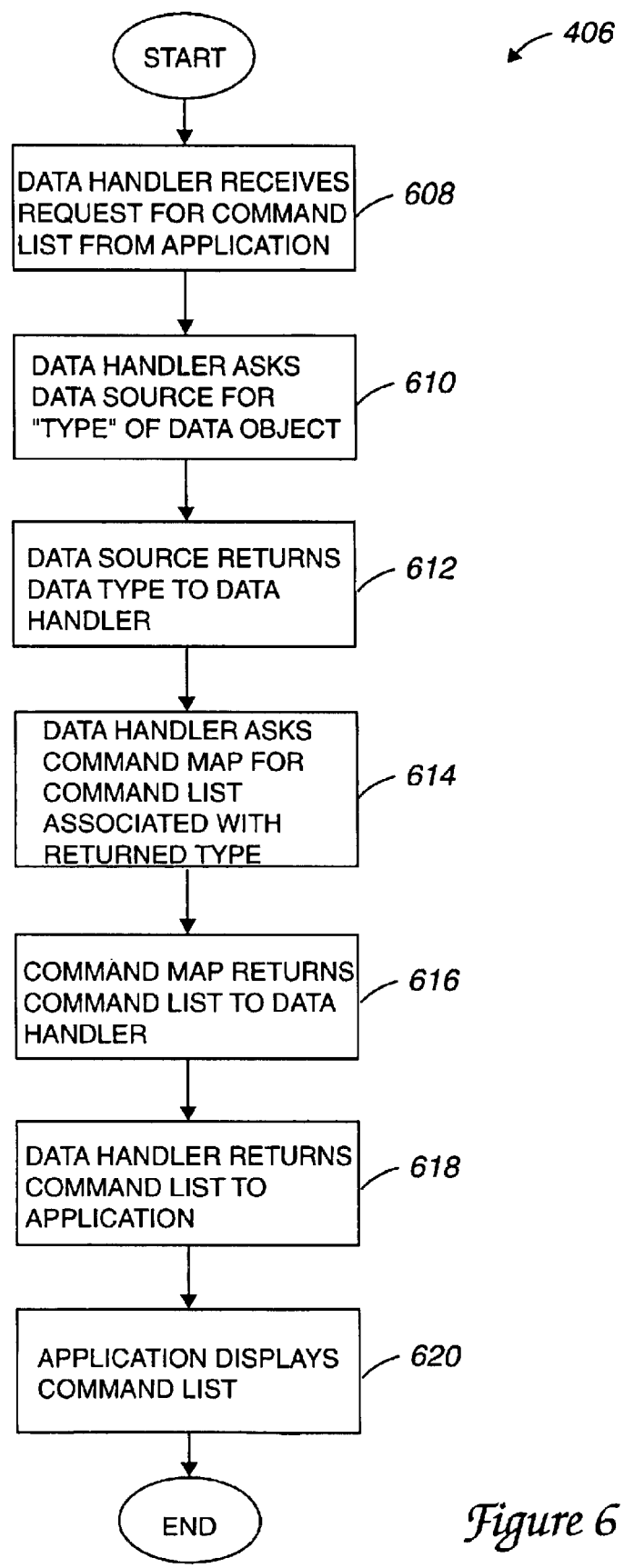
FIG. 6 is a process flow diagram which illustrates the steps associated with collecting and displaying a list of available commands, i.e., step 406 of FIG. 4, in accordance with an embodiment of the present invention.

With reference to FIG. 6, a process of collecting and displaying a list of available commands associated with a data object, i.e., step 406 of FIG. 4, will be described in accordance with an embodiment of the present invention. In step 608, the data handler receives a request from the application for a command list. As the command list is associated with the data object, the type associated with the data object may be used to locate the command list. Accordingly, in step 610, the data handler queries the data source for the type associated with the data object.

The data source returns the data type to the data handler in step 612, then, in step 614, the data handler queries the command map for the command list that is associated with the returned type. In general, it should be appreciated that each data type has an associated command list. Hence, a query to the command map for a command list will typically be successful. As such, the command map returns the command list associated with the data type to the data handler in step 616. The command map may generally use any suitable mechanism to locate the command list associated with the data type including, but not limited to, a look-up table. After the data handler has obtained the command list, the data handler returns the command list to the application in step 618, and the application displays the command list in step 620. Then, once the command list is displayed, the process of collecting and displaying the command list is completed.

Figure 7:
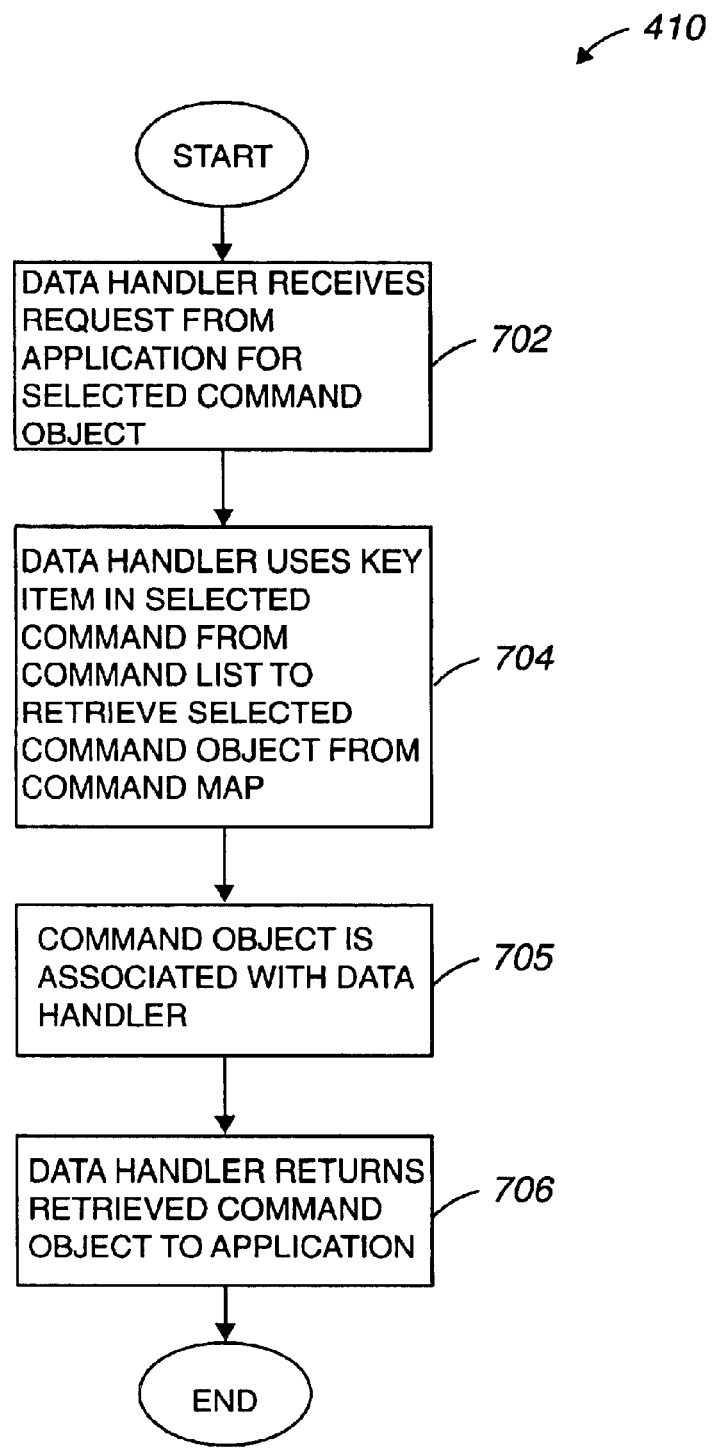
FIG. 7 is a process flow diagram which illustrates the steps associated with locating a command object associated with a selected command, i.e., step 410 of FIG. 4, in accordance with an embodiment of the present invention.

FIG. 7 is a process flow diagram which illustrates a process of obtaining a command object in accordance with an embodiment of the present invention. In other words, FIG. 7 illustrates the sub-steps associated with step 410 of FIG. 4. The process of obtaining a command object begins at step 702 where the data handler receives a request for a selected command object from the application. Although the selected command object may be any suitable software component, in the described embodiment, the selected command object is a Java™ Bean, which is generally a reusable software component, as previously described. It should be appreciated that the request for a selected command object entails selecting a command from the command list.

After the request for the selected command object is received, process flow proceeds to step 704 where the data handler uses as a key the selected command from the command list to retrieve the selected command object from the command map. In the described embodiment, each item in the command list has an associated "command information" reference which the command map uses as a key in the retrieval of the requested command object. The key may be used in any number of different ways to retrieve the requested command object. By way of example, the key may be used in a look-up table of command objects to obtain the desired command object.

In step 705, the command object retrieved from the command map is associated with the data handler. That is, the command object is associated with the data handler which the command object is to operate upon. Then, in step 706, the data handler returns the retrieved command object to the application, and the process of obtaining a command object is completed.

Figure 8:
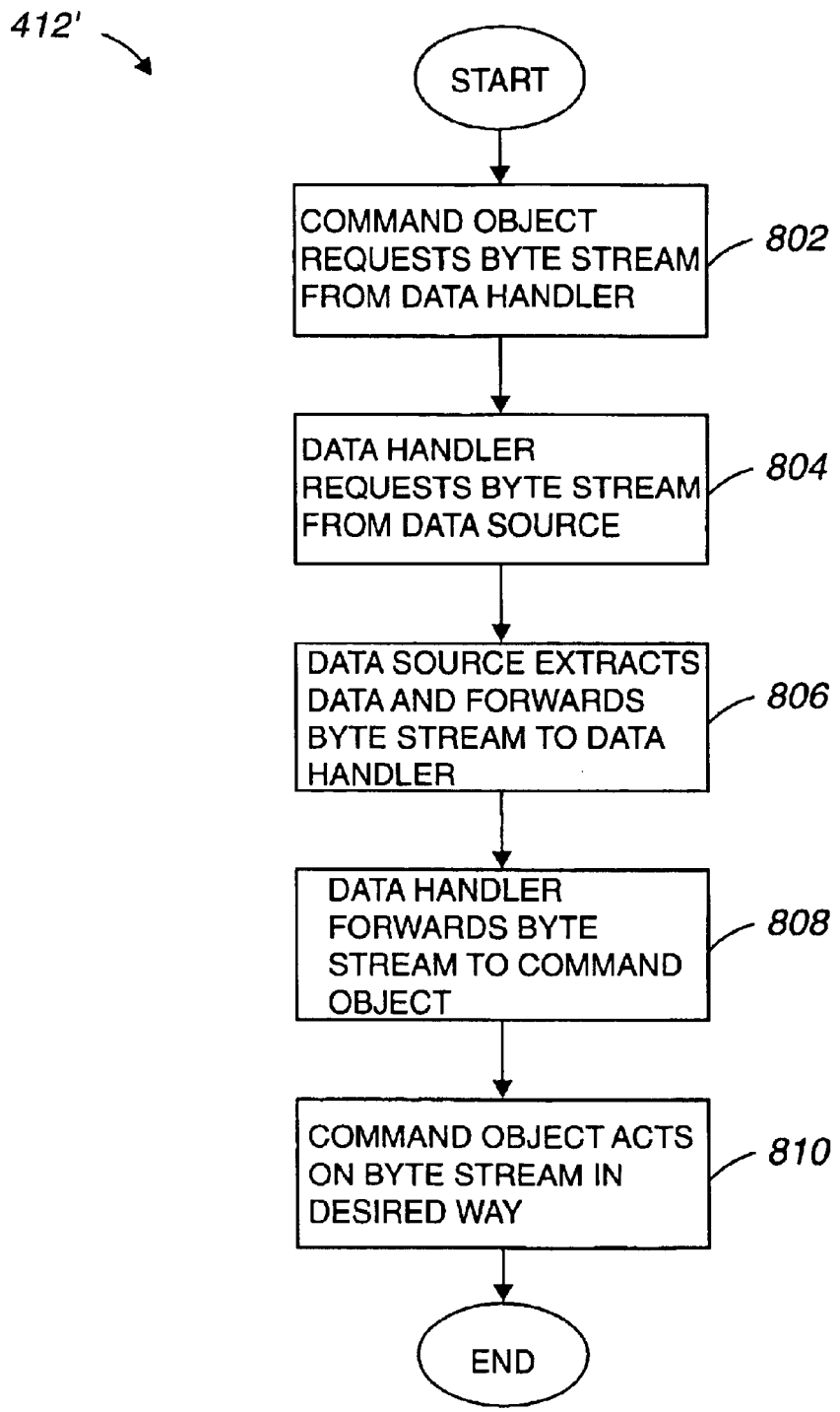
FIG. 8 is a process flow diagram which illustrates the steps associated with one method of executing a command object which operates on a byte stream, i.e., step 412 of FIG. 4, in accordance with an embodiment of the present invention.

Referring next to FIG. 8, the steps associated with one method of executing a command object, i.e., step 412 of FIG. 4, will be described in accordance with an embodiment of the present invention. In the described embodiment, the command object is arranged to operate on a stream of bytes, e.g., "raw" data which has not been converted into a data object by the data content handler. A byte stream may be requested instead of a data object, for example, when the command object is a viewer that is specifically arranged to display text, or a byte stream.

In step 802, a command object requests a byte stream from the data handler. The data handler passes the request for the byte stream to the data source in step 804. In response to the request for the byte stream, the data source extracts data from the storage mechanism in which the data is stored, then forwards the data, i.e., byte stream, to the data handler in step 806. It should be appreciated that the data source may extract data from any suitable storage mechanism, as for example a data file or an electronic mail message. In one embodiment, the data source may also decode, e.g., decrypt and decompress, extracted data After the data handler receives the byte stream from the data source, the data handler forwards the byte stream to the command object in step 808. Then, in step 810, the command object acts on the byte stream in the desired way. By way of example, if the command object is a text viewer, then the command object acts on the byte stream by displaying the byte stream. After the command object acts on the byte stream, the steps associated with the execution of the command object are completed.

Figure 9:
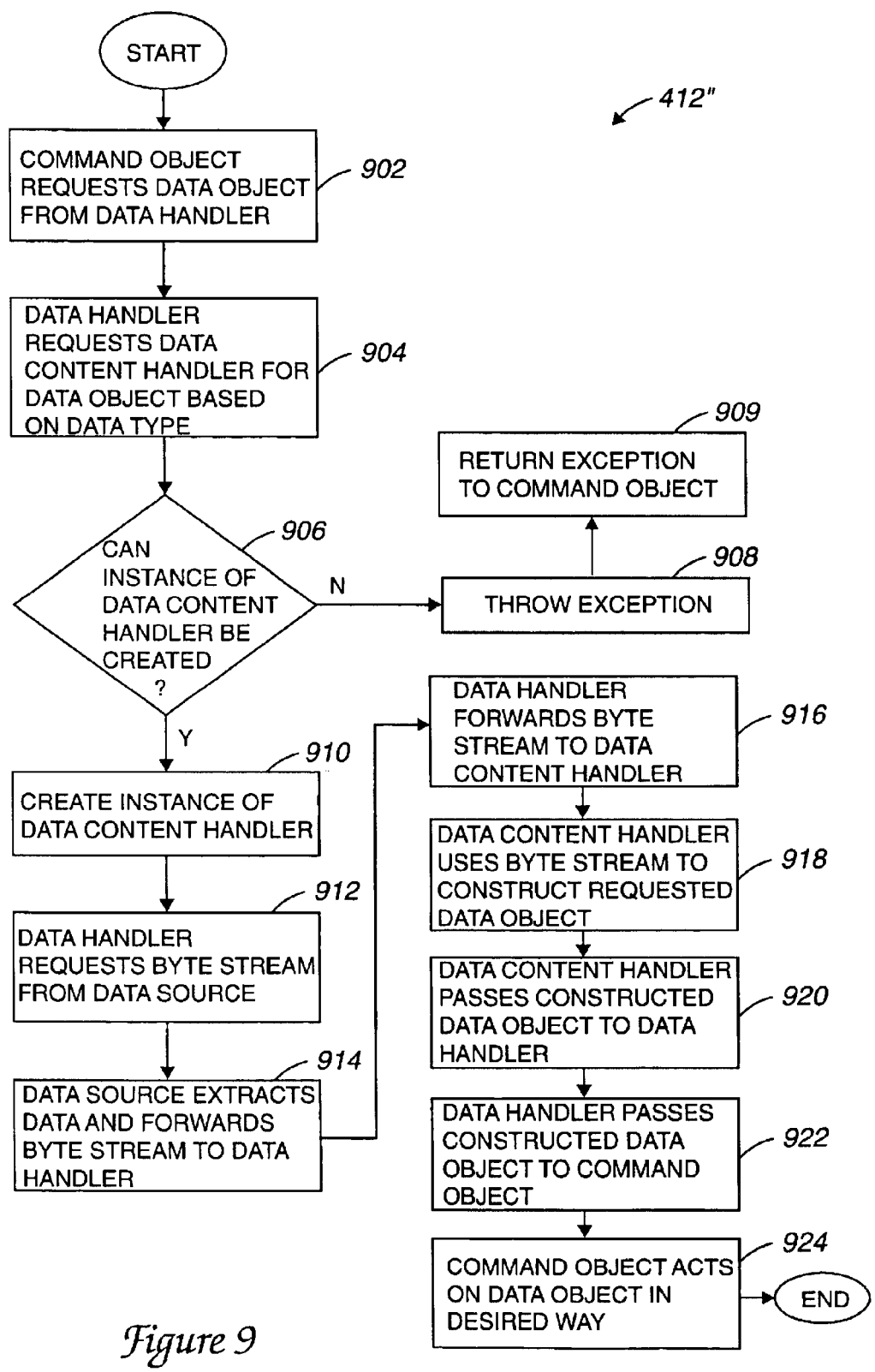
FIG. 9 is a process flow diagram which illustrates the steps associated with another method of executing a command object which operates on a data object, i.e., step 412 of FIG. 4, in accordance with an embodiment of the present invention.

FIG. 9 is a process flow diagram which illustrates the steps associated with another method of executing a command object, i.e., step 412 of FIG. 4, in accordance with an embodiment of the present invention. In step 902, the command object requests a suitable data object from the data handler. That is, a data object of the type associated with the command object is requested. By way of example, if the command object is anJava™ Bean that is an image viewer, then the data object that is requested may be a Java™ image object. The data handler makes a request for an instance of data content handler class that is associated with the data object in step 904. It should be appreciated that the request for the data content handler is based on the data type associated with the data object. That is, an instance of the data content handler that is requested is associated with the data type.

In step 906, a determination is made regarding whether an instance of the data content handler can be created, or instantiated, for the identified data content handler class. If the determination is that a data content handler cannot be created, then process flow proceeds to step 908 where an exception is thrown to indicate that a suitable data content handler may not be created. The exception is then returned to the command object in step 909.

If the determination in step 906 is that it is possible to create a data content handler, then process flow moves from step 906 to step 910 where an instance of the data content handler is created. Once the data content handler is created, the data handler requests a byte stream from the data source in step 912. In other words, the data handler requests data from the data source. Upon receiving a request for a byte stream, in step 914, the data source extracts the requested byte stream, or data, from the associated storage mechanism and forwards the byte stream to the data handler. In one embodiment, the data source may also forward the requested byte stream directly to the data content handler.

The data handler forwards the byte stream to the data content handler in step 916. After the data content handler receives the forwarded byte stream, in step 918, the data content handler uses the byte stream to construct the requested data object, i.e., the data object that was requested in step 902. It should be appreciated that any suitable method in any appropriate computer language, as for example a method used to construct Java™ objects, may be used to construct the data object from the byte stream. In one embodiment, commands available in the Java™ programming language enable a byte stream that is in a JIF format to be converted into a Java™ image object.

The constructed data object is passed from the data content handler to the data handler in step 920. The data handler, in step 922, passes the constructed data object to the command object that requested the data object. Then, in step 924, the command object acts on the data object in the desired way. By way of example, a command object that is an image viewer acts on an image data object by displaying the image data object. The process of an application executing a command object ends after the command object acts on the data object in the desired way.

Figure 10:
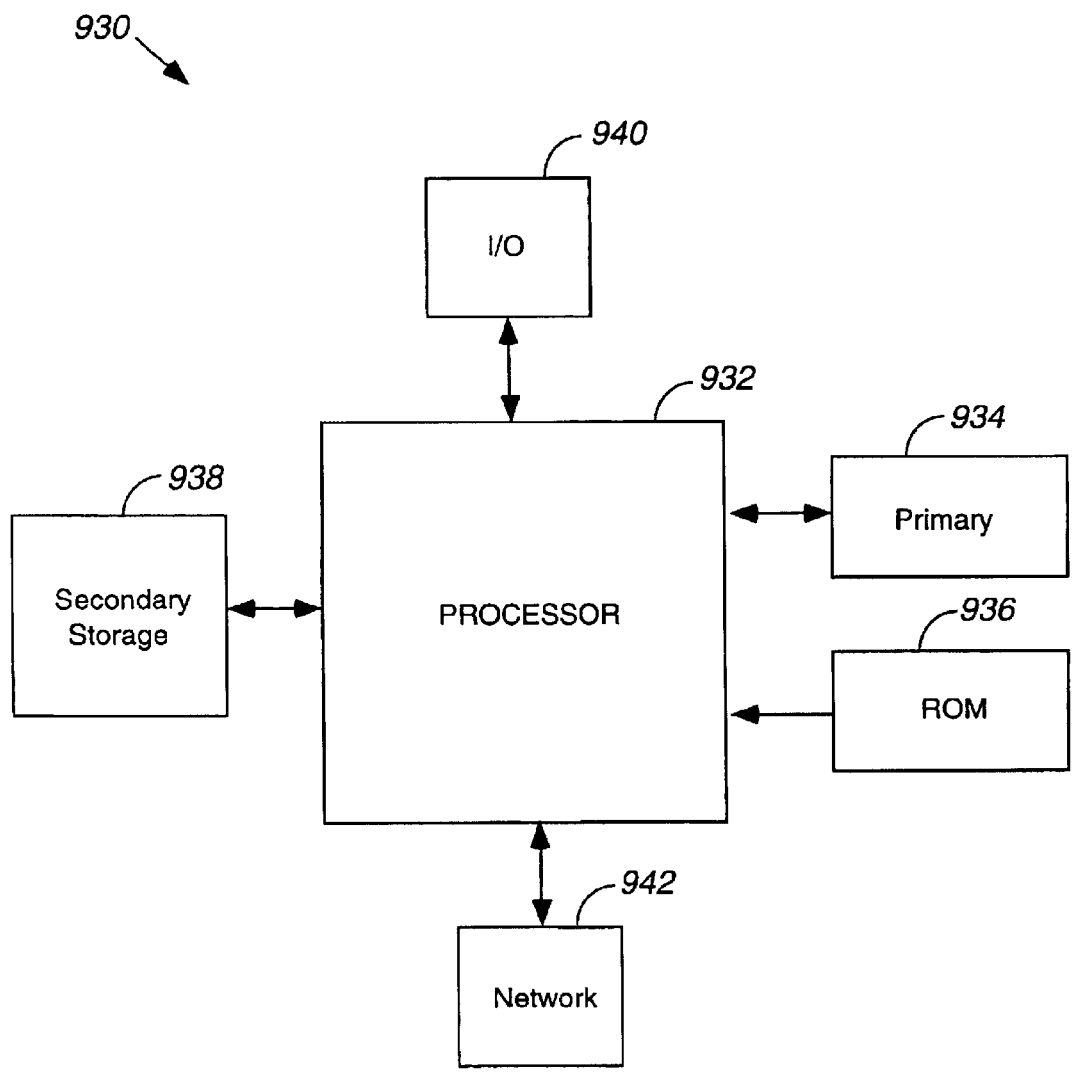
FIG. 10 is a diagrammatic representation of a computer system suitable for implementing the present invention in accordance with an embodiment of the present invention.

FIG. 10 illustrates a typical computer system in accordance with the present invention. The computer system 930 includes any number of processors 932 (also referred to as central processing units, or CPUs) that are coupled to memory devices including primary storage devices 936 (typically a read only memory, or ROM) and primary storage devices 934 (typically a random access memory, or RAM). As is well known in the art, ROM 936 acts to transfer data and instructions uni-directionally to the CPU and RAM 934 is used typically to transfer data and instructions in a bi-directional manner. Both primary storage devices 934, 936 may include any suitable computerreadable media, as will be appreciated by those skilled in the art. A mass memory device 938 is also coupled bi-directionally to CPU 932 and provides additional data storage capacity. Mass memory device 938 may be used to store programs, data and the like and is typically a secondary storage medium such as a hard disk that is slower than primary storage devices 934, 936. Mass memory storage device 938 may take the form of a magnetic or paper tape reader, or some other well-known device. It will be appreciated that the information retained within the mass memory device 938 may, in appropriate cases, be incorporated in standard fashion as part of RAM 936 as virtual memory. A specific mass storage device such as a CD-ROM (not shown) may also pass data unidirectionally to the CPU.

CPU 932 is also coupled to one or more input/output devices 940 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 932 optionally may be coupled to a computer or telecommunications network, e.g., an Internet network on the World Wide Web, using a network connection as shown generally at 942. With such a network connection, it is contemplated that CPU 932 might receive information from the network, or might output information to the network in the course of performing the above-described method steps. The above-described devices and materials will be familiar to those of skill in the computer hardware and software arts.

Although only a few embodiments of the present invention have been described, it should be understood that the present invention may be embodied in many other specific forms without departing from the spirit or scope of the present invention. By way of example, the steps associated with retrieving information, e.g., a name and an icon for a data object, from a data source and a command map, respectively, may be widely varied. By way of example, although the process of collecting a name and an icon for a data object from a data handler has been described in terms of first obtaining a name, then obtaining an associated icon, the icon may be obtained prior to obtaining the name without departing from the spirit or the scope of the present invention.

Similarly, the steps associated with creating a data source object may also be widely varied. For example, although the process of creating a data source object has been described as including a determination of whether an associated data source object exists, it should be appreciated that, alternatively, a new, application-specific data source may be designed even if an associated data source object does exist.

Further, although data source objects and instances of data handlers have been described as being created while an application is being executed, i.e., at run-time, the data source objects may be created at any suitable time. By way of example, data source objects and data handlers may instead be created only when data associated with a data source object is requested through an application. Alternatively, data source objects and data handlers for all data which is accessible to an application may be created prior to the execution of the application. It should be appreciated that data source objects and data handlers may also be eliminated at any suitable time, e.g., immediately after use or at the termination of the application, without departing from the spirit or the scope of the present invention. Therefore, the present examples are to be considered as illustrative and not restrictive, and the invention is not to be limited to the details given herein, but may be modified within the scope of the appended claims.

What is claimed is:

1. A computer-implemented framework for associating data with a command object, the command object being arranged to operate on the data, wherein the data is associated with a selected application, the computer-implemented framework comprising:

a data handler mechanism arranged as a generic interface with a plurality of applications, the plurality of applications including the selected application, wherein the generic interface allows use of new command objects without modifying the plurality of applications;

a data retriever mechanism in communication with the data handler mechanism the data retriever mechanism being arranged to obtain the data and to pass the data to the data handler mechanism; and a mapping mechanism in communication with the data handler mechanism, the mapping mechanism being separate from the data handler mechanism, the mapping mechanism being arranged to obtain a command list for the selected application to display through the data handler mechanism, the command list including the command object obtained by the mapping mechanism based substantially on the data, wherein the command object is executed by the selected application upon selection of the command object from the command list, wherein the command list includes a plurality of command objects including the command object, the plurality of command objects being usable by the plurality of applications.

2. A computer-implemented framework according to claim 1 wherein the data is a stream of bytes, and the data handler mechanism is further arranged to bind the stream of bytes to the command object.

3. A computer-implemented framework according to claim 1 wherein the data retriever mechanism includes a data content handler mechanism in communication with the data handler mechanism, the data content handler mechanism being arranged to convert the data into a data object, wherein the data handler mechanism is further arranged to bind the data object to the command object.

4. A computer-implemented framework as recited in claim 3 wherein the data object is created using the Java™ programming language, and the command object is a Java™ command object.

5. A computer-implemented framework as recited in claim 1 wherein the data is one of text data and image data.

6. A computer-implemented framework as recited in claim 1 wherein the data handler is further arranged to receive a request from the application, to bind the data to the command object, and to return the command object to the application.

7. A computer-implemented framework as recited in claim 1 wherein the data retriever includes a data source mechanism arranged to obtain a stream of bytes and a data content handler mechanism arranged to convert the stream of bytes into a data object, the data source mechanism being in communication with the data content handler mechanism, wherein the data handler mechanism is further arranged to bind the data object to the command object.

8. A computer-implemented framework as recited in claim 1 wherein the mapping mechanism includes a look-up table arranged to associate the command object with the data.

9. A computer-implemented framework as recited in claim 1 wherein the mapping mechanism and the data handler mechanism are separately maintained.

10. A computer-implemented method for associating data with a command object in response to a request from a selected application, the method comprising:
   accessing the data through an interface in response to the request from the selected application, the interface being independent from the application and in communication with a plurality of applications including the selected application, wherein the request from the selected application is processed by the interface, the interface allowing use of new command objects without modifying the plurality of applications;
   accessing a mapping mechanism which is in communication with the interface, the mapping mechanism being independent from the plurality of applications such that the mapping mechanism is not a component of the plurality of applications, the mapping mechanism being maintained separately from the interface, the mapping mechanism further being arranged to locate an installed command object that is appropriate for the data, wherein the mapping mechanism is accessed by the interface;
   obtaining the command object that is appropriate for the data from a displayable command list identifying commands associated with the data, wherein the mapping mechanism obtains the command object and passes the obtained command object to the interface;
   binding the command object to the data, wherein the interface binds the command object to the data; and
   returning the command object to the selected application to allow execution of the command object,
   wherein the command list includes a plurality of command objects including the command object, the plurality of command objects being usable by the plurality of applications.

11. A computer-implemented method as recited in claim 10 wherein accessing the data through an interface includes:
   passing a stream of bytes to a data content handler mechanism arranged to create a data object from the stream of bytes; and
   passing the data object to the interface, wherein the data is the data object.

12. A computer-implemented method as recited in claim 11 wherein the data object is created using the Java™ programming language, and the command object is a Java™ command object.

13. A computer-implemented method as recited in claim 10 wherein accessing the data through the interface includes accessing a data retriever which is arranged to obtain the data, wherein the data is a stream of bytes.

14. A computer-implemented method as recited in claim 10 further including operating on the data using the command object.

15. A computer-implemented method as recited in claim 10 wherein the command object that is appropriate for the data is selected from a set of command objects associated with a command list, the command list being associated with the data, the method further including accessing the command list, wherein the command list is accessed by the interface.

16. A computer-implemented method as recited in claim 15 wherein accessing the command list includes receiving a request for a command list from the application, the request for the command list being received by the interface, wherein the interface performs the steps of:
   obtaining a type associated with the data;
   obtaining the command list through the mapping; and
   returning the command list to the application.

17. A computer program product for associating data with a command object in response to a request from a selected application, the computer program product comprising:
   computer code for accessing the data through an interface in response to the request from the selected application, the interface being independent from the application and in communication with a plurality of applications including the selected application, wherein the request from the selected application is processed by the interface, the interface allowing use of new command objects without modifying the plurality of applications;
   computer code for accessing a mapping mechanism which is in communication with the interface, the mapping mechanism being independent from the plurality of applications such that the mapping mechanism is not a part of the plurality of applications, the mapping mechanism further being separately maintained from the interface, the mapping mechanism further being arranged to locate an installed command object that is appropriate for the data, wherein the mapping mechanism is accessed by the interface;
   computer code for obtaining the command object that is appropriate for the data from a displayable command list identifying commands associated with the data, wherein the mapping mechanism obtains the command object and passes the obtained command object to the interface;
   computer code for binding the command object to the data, wherein the interface binds the command object to the data; and
   computer code for returning the command object to the selected application to allow execution of the command object, and a computer-readable medium that stores the computer codes, wherein the command list includes a plurality of command objects including the command object, the plurality of command objects being usable by the plurality of applications.

18. A computer-readable medium as recited in claim 17 wherein the computer program code devices configured to cause the computer to access the data through an interface include computer program code devices configured to cause a computer to execute the steps of:

passing a stream of bytes to a data content handler mechanism arranged to create a data object from the stream of bytes; and passing the data object to the interface, wherein the data is the data object.

19. A computer-readable medium as recited in claim 18 wherein the data object is created using the Java™ programming language, and the command object is a Java™ command object.

20. A computer-readable medium as recited in claim 17 further including computer program code devices configured to cause the computer to operate on the data using the command object.

21. A computer-readable medium as recited in claim 17 wherein the command object that is appropriate for the data is selected from a set of command objects associated with a command list, the command list being associated with the data, the computer-readable medium further including computer code devices configured to cause the computer to access the command list through the interface.

22. A computer-implemented framework according to claim 17 wherein the command object is obtained by the mapping mechanism based substantially on the data without an external input from a user of the application.

23. A computer-implemented framework according to claim 17 wherein the command object is obtained by the mapping mechanism based substantially on the data without directly involving the application.

24. A computer-implemented framework for associating data with a command object, the command object being arranged to operate on the data, wherein the data is associated with a selected application, the computer-implemented framework comprising:

a data handler mechanism arranged to interface with a plurality of applications, the plurality of applications including the selected application, wherein the data handler mechanism is independent from the plurality of applications and allows use of new command objects without modifying the plurality of applications;

a data retriever mechanism in communication with the data handler mechanism, the data retriever mechanism being arranged to obtain the data and to pass the data to the data handler mechanism; and a mapping mechanism in communication with the data handler mechanism, the mapping mechanism being substantially separate from the data handler mechanism, the mapping mechanism being arranged to obtain the command object from a command list identifying commands associated with the data to the plurality of applications for display, the command list provided by using a data handler mechanism, wherein the mapping mechanism is associated with the plurality of applications and is arranged to obtain the command object for execution without directly involving the selected application, wherein the command list includes a plurality of command objects including the command object, the plurality of command objects being usable by the plurality of applications.

25. A computer-implemented framework as recited in claim 24 wherein the mapping mechanism and the data handler mechanism are separately maintained.

26. A computer-implemented framework as recited in claim 24 wherein the mapping mechanism is not a component of the data handler mechanism.

27. A computer-implemented framework as recited in claim 24 wherein the mapping mechanism is not specific to the application while the data handler mechanism is substantially specific to the application.

* * * * *